(12) United States Patent
Li et al.

(10) Patent No.: US 8,724,889 B2
(45) Date of Patent: May 13, 2014

(54) METHOD AND APPARATUS FOR CT IMAGE RECONSTRUCTION

(75) Inventors: Liang Li, Beijing (CN); Zhiqiang Chen, Beijing (CN); Li Zhang, Beijing (CN); Kejun Kang, Beijing (CN); Yuxiang Xing, Beijing (CN); Ziran Zhao, Beijing (CN); Yongshun Xiao, Beijing (CN); Zhifeng Huang, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 298 days.

(21) Appl. No.: 13/140,761

(22) PCT Filed: May 11, 2011

(86) PCT No.: PCT/CN2011/000830
§ 371 (c)(1),
(2), (4) Date: Nov. 11, 2011

(87) PCT Pub. No.: WO2012/055147
PCT Pub. Date: May 3, 2012

(65) Prior Publication Data
US 2012/0106832 A1    May 3, 2012

(30) Foreign Application Priority Data
Oct. 28, 2010   (CN) .......................... 2010 1 0529974

(51) Int. Cl.
| | |
|---|---|
| *G06K 9/00* | (2006.01) |
| *A61B 6/00* | (2006.01) |
| *G01N 23/00* | (2006.01) |
| *G21K 1/12* | (2006.01) |
| *H05G 1/60* | (2006.01) |

(52) U.S. Cl.
USPC ................ 382/154; 382/128; 382/131; 378/4

(58) Field of Classification Search
USPC .......... 382/100, 128–134, 154, 210; 434/262, 434/267; 606/1, 45, 139, 159; 600/101, 600/109, 112, 114, 117–118, 139, 145, 173, 600/420, 424, 427, 434, 415–416, 562, 600/587; 378/4, 15, 17, 210
See application file for complete search history.

(56) References Cited

U.S. PATENT DOCUMENTS 6,771,733 B2 *   8/2004   Katsevich .......................... 378/4
(Continued)

FOREIGN PATENT DOCUMENTS

| CN | 101404088 A | 4/2009 |
|---|---|---|
| CN | 101478920 A | 7/2009 |

OTHER PUBLICATIONS

M. Gross, Th Kohler, and R Proksa; "3D cone-beam CT reconstruction for circular trajectories", Philips Research Laboratory; Phys. Med. Biol. 45(2000) 329-347 PII: S0031-9155(00)05487-7, Oct. 27, 1999.*

(Continued)

*Primary Examiner* — Hadi Akhavannik
*Assistant Examiner* — Mehdi Rashidian
(74) *Attorney, Agent, or Firm* — Kenyon & Kenyon LLP (57) ABSTRACT

A method and apparatus for CT image reconstruction may include selecting, by a unit, projection data of the same height on a curve having a curvature approximate to that of the scanning circular orbit, implementing, by a unit, a weighting processing on the selected projection data, filtering, by a unit, the weighting processed projection data along a horizontal direction, implementing, by a unit, three-dimensional back projection on the filtered projection data along the direction of ray. The method and apparatus can effectively eliminate cone beam artifact under a large cone angle.

8 Claims, 7 Drawing Sheets

(56) References Cited

U.S. PATENT DOCUMENTS

| | | |
|---|---|---|
| 7,430,270 B2 * | 9/2008 | Bontus et al. .................... 378/17 |
| 7,492,854 B2 * | 2/2009 | Nishide et al. .................... 378/4 |
| 2003/0161444 A1 * | 8/2003 | Katsevich ..................... 378/210 |
| 2007/0110209 A1 * | 5/2007 | Nishide et al. .................... 378/4 |
| 2007/0147575 A1 * | 6/2007 | Katsevich ......................... 378/4 |
| 2007/0172019 A1 * | 7/2007 | Tang et al. ........................ 378/4 |
| 2007/0253528 A1 * | 11/2007 | Ning et al. ...................... 378/15 |
| 2008/0013676 A1 * | 1/2008 | Bontus et al. .................... 378/17 |
| 2009/0110259 A1 * | 4/2009 | Yin et al. ....................... 382/132 |
| 2009/0238412 A1 * | 9/2009 | Grass et al. .................... 382/107 |
| 2009/0310845 A1 * | 12/2009 | Ogawa et al. ................. 382/132 |
| 2010/0092053 A1 * | 4/2010 | Manabe et al. ............... 382/128 |
| 2010/0111393 A1 * | 5/2010 | Okumura et al. ............. 382/131 |
| 2010/0158335 A1 * | 6/2010 | Ning et al. .................... 382/131 |
| 2012/0051626 A1 * | 3/2012 | Long et al. .................... 382/154 |

OTHER PUBLICATIONS

International Search Report (ISR) issued in corresponding PCT Application No. PCT/CN2011/000830, mailed Jul. 28, 2011 (English translation of ISR included).

Zhang Jian et al., "Review of recent development in FDK reconstruction algorithms for 3D cone beam CT," Chinese Journal of Stereology and Image analysis, vol. 10, No. 2, Jun. 2005, pp. 116-121.

Chen Lian et al., "Segmentation Short Scan FDK Reconstruction Algorithm for Cone-Beam CT," Journal of Tsinghua University (Science and Technology), 2009, vol. 49, No. 6, pp. 844-847 (with English abstract).

Chinese First Office Action with Search Report issued May 9, 2013 in corresponding Chinese Application No. 201010529974.0 (with English translation of search report).

L.A. Feldkamp, L.C. Davis, and J.W. Kress, "Practical cone-beam algorithm," Journal of the Optical Society of America, vol. 1, No. 6, Jun. 1984, pp. 612-619.

* cited by examiner

METHOD AND APPARATUS FOR CT IMAGE RECONSTRUCTION

FIELD OF THE INVENTION

The present invention relates to technical fields of Computed Tomography (CT) imaging, and more particularly to a method and apparatus for CT image reconstruction.

BACKGROUND INFORMATION

Since Hounsfield invented the first CT machine in 1972, CT technology has brought revolutionary influence to medical diagnosis and industrial non-destructive detecting. CT has become an important detecting means for industries of medical treatment, biology, aeronautics, astronautics, national defense, etc. With the improvement of the technology, CT scanning modes and imaging methodologies have been continually improved, and three-dimensional cone-beam CT has become the mainstream of research and application. X-ray cone-beam CT has been broadly applied in fields of clinical medicine, security inspection, non-destructive detecting, etc. In particular, because the cone-beam CT system based on circular orbit scanning is comparatively simple with respect to mechanics, electronic control, and so forth, and is easy for engineering realization, it is very broadly applied in clinical medicine, security inspection, and industrial non-destructive detecting. In circular-orbit cone-beam reconstruction methods, the most broadly applied method is FDK method proposed by Feldkamp et al. (Feldkamp L. A., L. C. Davis, and J. W. Kress, Practical cone-beam algorithm, Journal of the Optical Society of America, 1984, (1): 612-619).

The FDK method can be deemed as an approximate expansion to the fan-beam FBP (Filtered Backprojection) method under three-dimensional condition. The FDK method includes the following steps: initially implementing weighting processing on projection data; then implementing one-dimensional filtering on the projection data of different projection angles in the horizontal direction; and finally implementing three-dimensional back projection along the direction reverse to the X-ray to obtain a last three-dimensional reconstructed image of the object.

Thus, it can be seen that the reconstructed voxel values of the FDK method are based on the sum of the contribution of radiation passing through the voxel in the projection angle range of 360 degrees. Accordingly, the circular-orbit cone-beam FDK method, as an approximate method, has the characteristics where the mathematical formula is simple and the method computation is fast, and it is easy for engineering realization. Moreover, when the cone angle is comparatively small (generally within ±5°), it can achieve a very good reconstruction effect, and it is therefore broadly appreciated in practical engineering application.

However, the FDK method also has certain problems. Because the circular orbit scanning per se does not satisfy the condition of data completeness for cone-beam precise reconstruction, there exists the problem of Radon data loss. Thus, when the cone angle of the cone beam increases, the resulting image reconstructed by the FDK method will include serious cone beam artifact, and the FDK reconstruction value will decrease fast in a plane far away from the scanning orbit, such that the method is greatly limited in application in a CT imaging system having a flat panel detector.

In order to improve the quality of image reconstruction of a circular-orbit FDK method under a large cone angle, based on the FDK method, a plurality of improved FDK methods are proposed, including, for example, P-FDK (parallel FDK), T-FDK (tent-FDK), HT-FDK (hybrid tent-FDK), EFDK (extended FDK), etc. In these improved FDK methods, because P-FDK and T-FDK are simple and can be easily implemented in engineering, they are comparatively broadly applied, and are therefore described briefly below in greater detail.

Figure 1:
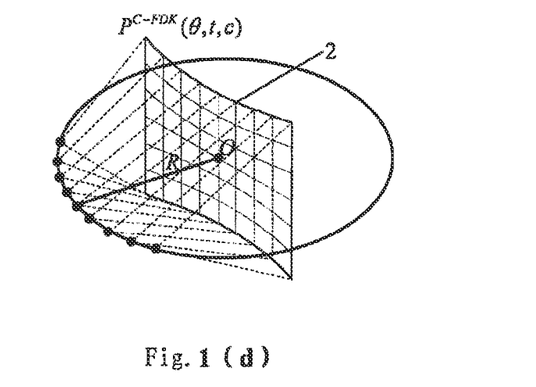
FIG. 1(a) is a schematic diagram of conventional flat-panel-detector circular-orbit cone-beam CT scanning.
FIG. 1(b) is a schematic diagram of a state after rebinning projection data obtained by FIG. 1(a) using a conventional P-FDK method.
FIG. 1(c) is a schematic diagram a state after rebinning projection data obtained by FIG. 1(a) using a conventional T-FDK method.
FIG. 1(d) is a schematic diagram of a state after rebinning projection data obtained by FIG. 1(a) using a method for CT image reconstruction, according to an example embodiment of the present invention.
Figure 1A:
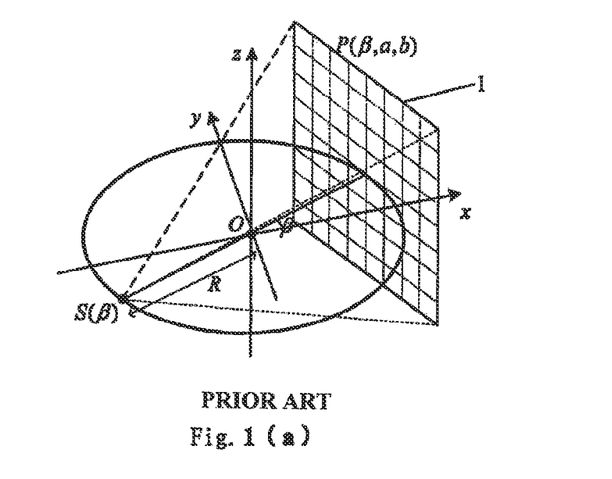
Figure 1B:
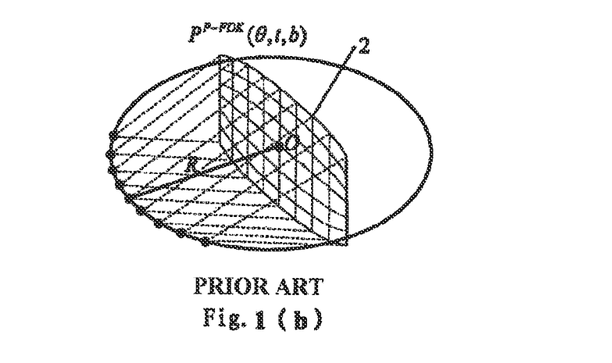

The P-FDK method is to obtain parallel fan-beam projection data by rebinning cone-beam projection data, and then reconstructing a three-dimensional image of an object through a Filtered Backprojection Method. As shown in FIG. 1(a), which is a schematic diagram of a scan by a circular-orbit cone-beam CT system using a flat panel detector, S(β) indicates the location of the X-ray source on the circular orbit, β indicates the angular sampling location of projection on the circular orbit, P(β,a,b) indicates the projection data on the flat panel detector, (a,b) is a rectangular coordinate system defined on the flat panel detector for indicating the location coordinates of each X-ray projected on the detector, R is the radius of the circular orbit. FIG. 1(b) shows a rebinning of cone-beam projection into fan-beam projection of parallel beams using the P-FDK method. The black solid dots represent the X-ray source, on a central virtual detector, in regard of the rebinned projection data. Because the distances from the parallel fan beams to the virtual detector under the same angle are different, a row of projection on the original flat panel detector are not horizontal on the corresponding virtual detector anymore. Instead, they are on a curve convex along the central row of the virtual detector. Taking the flat panel detector as an example, the data rebinning formula of P-FDK is as follows:

$$P^{P\text{-}FDK}(\theta, t, b) = P\left(\theta - \arcsin\frac{t}{R}, \frac{tR}{\sqrt{R^2 - t^2}}, b\right), \quad (1)$$

wherein θ indicates the sampling location of the rebinned projection data in angular direction after rebinning by P-FDK, (t,b) is the rectangular coordinate system on the central virtual detector after the rebinning, indicating the location coordinates of each X-ray on the virtual detector after the rebinning. The subsequent derivation processes of the present invention also takes the flat panel detector as an example, other types of detectors, such as, for example, a cylindrical surface detector, can be obtained by making corresponding changes based on the flat panel detector, details of the changes not being further described herein.

The P-FDK method differs from the FDK method only in that the P-FDK method includes rebinning into parallel fan-beams such that the process of calculating weighting coefficients is omitted during back projection, while the method is not different from the FDK method in image quality.

Figure 1C:
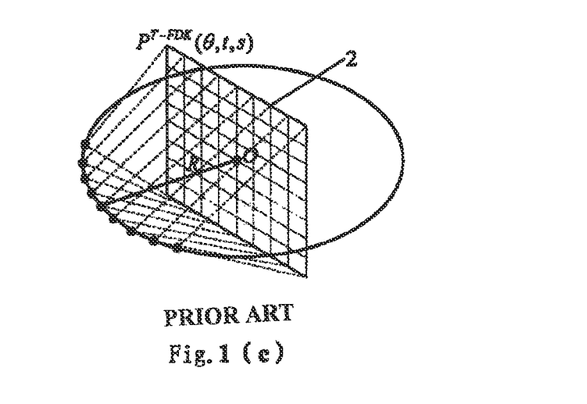

The T-FDK method proposed by Grass et al. in 2000 provides an improvement. T-FDK provides for rebinning for a second time in a vertical fan-beam plane, in addition to rebinning the cone-beam projection into parallel fan beams. That is, T-FDK provides for rebinning projection data in both the horizontal and vertical directions, ultimately causing the difference of T-FDK from P-FDK to be in that the direction of filtering the projection data according to T-FDK is along the horizontal direction of the central virtual detector, which is as shown in FIG. 1(c), rather than along the convex curve direction. The data rebinning formula of T-FDK method is as follows:

$$P^{T\text{-}FDK}(\theta, t, s) = P\left(\theta - \arcsin\frac{t}{R}, \frac{tR}{\sqrt{R^2 - t^2}}, \frac{sR^2}{R^2 - t^2}\right), \quad (2)$$

where θ indicates the sampling location of the rebinned projection data in angular direction after rebinning according to T-FDK, and (t,s) is the rectangular coordinate system on the central virtual detector after the rebinning according to T-FDK, indicating the location coordinates of each X-ray on the virtual detector after the rebinning.

T-FDK, compared to FDK, in one respect, is similar to P-FDK in that it provides for rebinning into parallel fan beams such that the weighting coefficient during back projection is omitted, and thus is more efficient with respect to calculation. Meanwhile, because the filtering of projection data according to the T-FDK method is implemented along the horizontal direction of the central virtual detector, it reduces cone beam artifact induced by increase of cone angle and improves image reconstruction quality, such that it is possible to realize accurate three-dimensional imaging of a large object using a large-area flat panel detector through circular-orbit scanning. Besides, there is another thought of improving the FDK method which uses conjugate rays in a circular-orbit scanning projection, different back projection weighting coefficients being selected for conjugate projection so as to improve the quality of the reconstructed image, and a comparatively good effect being also achieved.

With the gradual popularization of the flat panel detector, there are more and more new types of cone-beam CT systems that use a large-area flat panel detector, and the requirement for a large-cone-angle circular-orbit cone-beam CT image reconstruction method is even greater. Taking the dental cone-beam CT apparatus which is comparatively broadly applied in dental disease diagnosis at present as an example, three-dimensional dental CT imaging of a plurality of manufacturers at present use a flat panel detector of 20 cm×25 cm, the distance from the X-ray source to the detector is 70 cm, and the size of the cone angle corresponding to the circular orbit scanning is ±8.13°. Because doctors make disease diagnosis mainly dependent on CT value of image, i.e., pixel value of the reconstructed image, the requirement for reconstruction value of image from the medical-use CT is very high. Such large-cone-angle circular-orbit scanning goes far beyond the scope in which reconstruction can be done according to the FDK method, and the reconstruction result according to the T-FDK method is also unsatisfactory. Moreover, with the rapid development of the detector technology, detectors having an even larger-area flat panel have been applied in clinical use. For example, flat panel detectors of different sizes of 30 cm×40 cm, 43 cm×43 cm, etc. have been applied in clinical DR (Digital Radiography System). These detectors of even larger area can greatly improve the effective detection area of cone-beam X-ray, enlarge field of view of imaging, and most importantly, can reduce or even eliminate the problem where the CT value is unable to provide an accurate reconstruction due to truncation of cone-beam projection data. Therefore, a large-area flat-panel detector can be very broadly applied in current and future three-dimensional CT image apparatuses. However, with increase of the area of the flat panel detector, the cone angle of the three-dimensional CT system correspondingly increases, resulting in the difficult problem of how to eliminate serious cone beam artifact under a large cone angle.

SUMMARY OF THE INVENTION

A main technical problem to be solved by the invention is to provide a method and apparatus for CT image reconstruction that can eliminate serious cone beam artifact under a large cone angle.

In order to solve the above-mentioned problem, the technical solution of the method for CT image reconstruction of the present invention includes the steps of: selecting projection data of the same height on a curve having a curvature approximate to that of a scanning circular orbit; implementing weighting processing on the selected projection data; filtering the weighting processed projection data along a horizontal direction; and implementing three-dimensional back projection on the filtered projection data along the direction of a ray.

In an example embodiment, the step of selecting projection data of the same height on a curve having a curvature approximate to that of the scanning circular orbit includes selecting projection data according to the following formula:

$$P^{C\text{-}FDK}(\theta, t, c) = P\left(\theta - \arcsin\frac{t}{R}, \frac{tR}{\sqrt{R^2 - t^2}}, \frac{c \cdot R^2}{2(R^2 - t^2) - R\sqrt{R^2 - t^2}}\right)$$

where $P^{C\text{-}FDK}(\theta,t,c)$ indicates the selected projection data; $\theta$ indicates the projection direction; t indicates the distance between parallel fan beams; c indicates the angular sampling interval in the direction of Z axis; and R indicates the radius of the circular orbit.

In an example embodiment, the step of implementing weighting processing on the selected projection data includes processing the selected projection data according to the following formula:

$$\tilde{P}^{C\text{-}FDK}(\theta, t, c) = \frac{2\sqrt{R^2 - t^2} - R}{\sqrt{5R^2 - 4t^2 - 4R\sqrt{R^2 - t^2} + c^2}} \cdot P^{C\text{-}FDK}(\theta, t, c)$$

where, $\tilde{P}^{C\text{-}FDK}(\theta,t,c)$ indicates the weighting processed projection data.

In an example embodiment, the step of filtering the weighting processed projection data along the horizontal direction includes filtering according to the following formula:

$$g^{C\text{-}FDK}(\theta, t, c) = \tilde{P}^{C\text{-}FDK}(\theta, t, c) \otimes h(t) = \int_{-c_0}^{c_0} \tilde{P}^{C\text{-}FDK}(\theta, t, c) \cdot h(t - t')dt'$$

where $g^{C\text{-}FDK}(\theta,t,c)$ indicates the filtered projection data; $\otimes$ indicates the convolution; and h(t) indicates the filtering function.

In an example embodiment, the step of implementing three-dimensional back projection on the filtered projection data along the direction of the ray includes implementing three-dimensional back projection according to the following formula:

$$f^{C\text{-}FDK}(x, y, z) = \int_0^{2\pi} g^{C\text{-}FDK}(\theta, t(x, y, \theta), c(x, y, z, \theta))d\theta$$

where $f^{C\text{-}FDK}(x,y,z)$ indicates the reconstructed image in the direction of the X axis, Y axis and Z axis.

Correspondingly, an apparatus for CT image reconstruction according to an example embodiment of the present invention includes: a rebinning unit configured for selecting projection data of the same height on a curve having a curvature approximate to that of the scanning circular orbit; a weighting unit configured for implementing weighting processing on the selected projection data; a filtering unit configured for filtering the weighting processed projection data along the horizontal direction; and a back projection unit configured for implementing three-dimensional back projection on the filtered projection data along the direction of the ray.

In an example embodiment, the rebinning unit is configured to select projection data according to the following formula:

$$P^{C-FDK}(\theta, t, c) = P\left(\theta - \arcsin\frac{t}{R}, \frac{tR}{\sqrt{R^2-t^2}}, \frac{c \cdot R^2}{2(R^2-t^2) - R\sqrt{R^2-t^2}}\right)$$

where $P^{C-FDK}$ ($\theta$,t,c) indicates the selected projection data; $\theta$ indicates the projection direction; t indicates the distance between parallel fan beams; c indicates the angular sampling interval in the direction of Z axis; and R indicates the radius of the circular orbit.

In an example embodiment, the weighting unit is configured to process the selected projection data according to the following formula:

$$\tilde{P}^{C-FDK}(\theta, t, c) = \frac{2\sqrt{R^2-t^2} - R}{\sqrt{5R^2 - 4t^2 - 4R\sqrt{R^2-t^2} + c^2}} \cdot P^{C-FDK}(\theta, t, c)$$

where, $\tilde{P}^{C-FDK}$ ($\theta$,t,c) indicates the weighting processed projection data.

In an example embodiment, the filtering unit is configured to implement one-dimensional ramp filtering according to the following formula:

$$g^{C-FDK}(\theta, t, c) = \tilde{P}^{C-FDK}(\theta, t, c) \otimes h(t) = \int_{-c_0}^{c_0} \tilde{P}^{C-FDK}(\theta, t, c) \cdot h(t - t')dt'$$

where $g^{C-FDK}$ ($\theta$,c,t) indicates the filtered projection data; $\otimes$ indicates the convolution; and h(t) indicates the filtering function.

In an example embodiment, the back projection unit is configured to implement three-dimensional back projection according to the following formula:

$$f^{C-FDK}(x, y, z) = \int_0^{2\pi} g^{C-FDK}(\theta, t(x, y, \theta), c(x, y, z, \theta))d\theta$$

where $f^{C-FDK}$ (x,y,z) indicates the reconstructed image in the direction of X axis, Y axis and Z axis.

Compared to the prior art, a beneficial effect of the method and apparatus for CT image reconstruction of the present invention includes the following. The rebinning of projection data of the present invention selects projection data of the same height on a curve having a curvature approximate to that of the scanning circular orbit, providing sampling on a curve concave to the central row along the virtual central detector in the fan-beam plane parallel to the Z-axis, such that the numerical value accuracy of the reconstruction method under a large cone angle is greatly improved, and cone angle artifact due to a large cone angle is effectively inhibited.

In addition, the present invention is efficient in implementation and has strong stability.

DETAILED DESCRIPTION

In order to understand the disclosed content more thoroughly, example embodiments are described below with reference to the figures. While example embodiments of the invention are described in detail below, the invention is not limited to the following embodiments.

Figure 4:
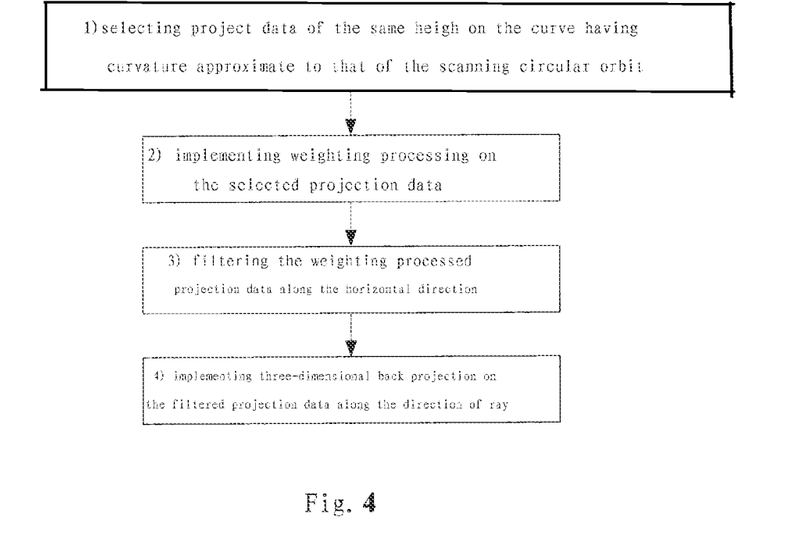
FIG. 4 is a flowchart of a method for CT image reconstruction, according to an example embodiment of the present invention.

As shown in FIG. 4, a method for CT image reconstruction according to an example embodiment of the present invention includes the steps of: 1) selecting projection data of the same height on a curve having a curvature approximate to that of the scanning circular orbit; 2) implementing weighting processing on the selected projection data; 3) filtering the weighting processed projection data along the horizontal direction; and 4) implementing three-dimensional back projection on the filtered projection data along the direction of a ray. These steps may be performed in a rebinning mode of the method for CT image reconstruction of the present invention, and a three-dimensional CT image of the scanned object can thereby be obtained.

For the curvature approximate to that of the scanning orbit, supposing that the curvature of the scanning circular orbit is 1/R, the approximate average curvature range may be, for example, 1/2R~2R. For the filtering, any filtering method available to those skilled in the art may be employed. For example, the filter kernel may be a most fundamental ramp filter kernel, and also may be a filter kernel obtained from the standard ramp filtering that has been implemented with smoothing processing in the frequency domain, for example, the commonly used S-L filter kernel, etc. (The S-L filter kernel is that proposed by L. A. Shepp and B. F. Logan in 1974).

The technical solution of the present invention is described with a flat panel detector as an example in the present description. Of course, the present invention may be applied to other panel detectors such as, for example, a cylindrical detector.

As shown in FIG. 1(a), firstly, the scanning path of the cone-beam X-ray source in a plane may be defined as a circle $\vec{S}(\beta)=R(\cos\beta, \sin\beta)$, where R is the radius of the circular orbit, and β indicates the angle parameter corresponding to the point of the ray source point. In FIG. 1(a), O is the origin of coordinates and the center of the circular orbit, i.e., the rotation center. P(β,a,b) indicates projection data acquired on a flat panel detector 1 after X-ray irradiates the scanned object, where (a,b) indicates horizontal and vertical coordinates of the location of a certain projection point on the two-dimensional flat panel detector 1.

Figure 2:
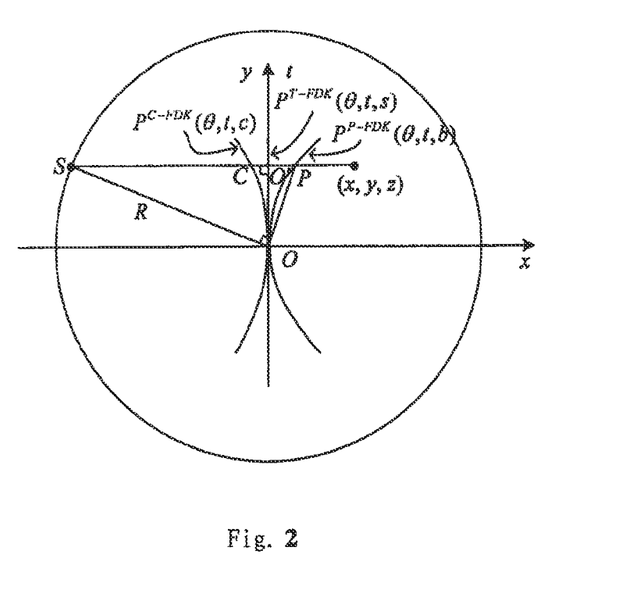
FIG. 2 is a top view showing the comparative features of the methods corresponding to FIGS. 1(a), 1(b), 1(c), and 1(d) along the rotation axis, i.e., Z axis.

According to the characteristics of the P-FDK method, after rebinning cone-beam projection data, the method selects projection data on a convex curve on a central virtual detector 2, as shown in FIG. 1(b). Referring to FIG. 2, which is a top view from top to bottom along the rotation axis, i.e., Z axis, the panel detectors turn into a straight line or a curve, and the solid dot S on the circular orbit indicates the X-ray source. In FIG. 2, the process of rebinning data according to P-FDK method may be regarded as combining projection data of the same height on the curve in FIG. 2 that pass through OP, and then, data of P-FDK, that is, the result of formula (1), is obtained, where the OP curve is a curve defined by rebinning formula (1) of P-FDK. The process of rebinning data according to the T-FDK method may be regarded as combining projection data of the same height on the straight line in FIG. 2 that pass through OO', then, data of T-FDK, that is, the result of formula (2), is obtained, where the OO' curve is a curve defined by rebinning formula (2) of T-FDK.

The process of data rebinning of a method for CT image reconstruction according to an example embodiment of the present invention (referred to herein as C-FDK) may be regarded as combining projection data of the same height on the curve in FIG. 2 that pass through OC. The OC curve is a segment of an arc with R as the radius. That is, it is a segment of an arc line having the same curvature as the scanning circular orbit, and the center of the curvature of the OC curve is on a straight line that passes through point O and is parallel to SC. Of course, the curvature of the OC curve may be slightly different than that of the scanning circular orbit. For example, it may be within the range of 50% to 200% of the curvature of the circular orbit. That is, projection data within this range can also achieve the effect approximate to that of the described example embodiment of the present invention.

The rebinning of projection data by the C-FDK method, according to an example embodiment of the present invention is accomplished in the two directions of horizontal and vertical of the central virtual detector. For example, it may be the same as the P-FDK and T-FDK methods in the horizontal direction, and in the vertical direction it may be as shown in FIG. 3 for the rebinned data:

$$c = \frac{SC}{SP} \cdot b = \frac{2\sqrt{R^2-t^2}-R}{R^2/\sqrt{R^2-t^2}} \cdot b = \frac{2(R^2-t^2)-R\sqrt{R^2-t^2}}{R^2} \cdot b, \quad (3)$$

where c indicates the coordinate of the central virtual detector in the vertical direction after the rebinning by the C-FDK method, S indicates the location of the intersection point at which the X-ray intersects the orbit, the X-ray has an angle θ, and the distance from the X-ray to the central ray is t. Thus, SC indicates the distance from the point of the X-ray source located at S to curve OC along said X-ray. SP indicates the distance from the point of the X-ray source located at S to curve OP along said X-ray.

Figure 3:
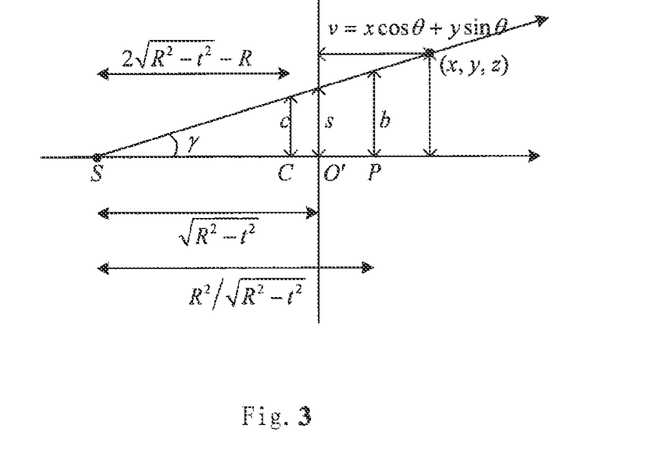
FIG. 3 is a side view of the vertical section of FIG. 2 passing through SC.

FIG. 3 is a vertical section passing through SC in FIG. 2, where the line with an angle γ to the axis on which SC is present is the X-ray. According to the definition of the OC arc line in FIG. 2, the lengths of SC, SP in FIG. 3 both can be obtained through calculation of spatial and geometric relations, the specific lengths thereof being as follows:

$$SO' = \sqrt{R^2-t^2} \quad (4)$$

$$SP = R^2/\sqrt{R^2-t^2} \quad (5)$$

$$SC = 2\sqrt{R^2-t^2}-R \quad (6)$$

Thus, the formula of rebinning the circular-orbit cone-beam CT projection data in an example embodiment of the C-FDK method of the present invention is as follows:

$$P^{C-FDK}(\theta, t, c) = P\left(\theta - \arcsin\frac{t}{R}, \frac{tR}{\sqrt{R^2-t^2}}, \frac{c \cdot R^2}{2(R^2-t^2)-R\sqrt{R^2-t^2}}\right) \quad (7)$$

where θ indicates the projection direction, t indicates the distance between parallel fan beams, and c indicates the angular sampling interval in the direction of Z axis.

After rebinning data by the C-FDK method using the above formula (7), the next step is implementing weighting processing on the projection data. The weighting coefficient may be cos γ, where γ is the angle between each X-ray and the projection line on the central plane projected by said X-ray along the direction of Z axis, as shown in FIG. 3, according to the spatial and geometric relations:

$$\cos\gamma = \frac{SC}{\sqrt{SC^2+c^2}} = \frac{2\sqrt{R^2-t^2}-R}{\sqrt{5R^2-4t^2-4R\sqrt{R^2-t^2}+c^2}} \quad (8)$$

That is, the formula of implementing weighting processing on the projection is:

$$\tilde{P}^{C-FDK}(\theta, t, c) = \frac{2\sqrt{R^2-t^2}-R}{\sqrt{5R^2-4t^2-4R\sqrt{R^2-t^2}+c^2}} \cdot P^{C-FDK}(\theta, t, c) \quad (9)$$

Then, one-dimensional ramp filtering may be implemented on the above-processed projection data along the horizontal direction:

$$g^{C-FDK}(\theta, t, c) = \quad (10)$$

$$\tilde{P}^{C-FDK}(\theta, t, c) \otimes h(t) = \int_{-c_0}^{c_0} \tilde{P}^{C-FDK}(\theta, t, c) \cdot h(t-t') dt'$$

In the formula above, ⊗ indicates convolution, and h(t) is a filtering function, for which a Ramp filter, for example, may be employed.

Lastly, implementing three-dimensional back projection on the filtered projection data along the direction of ray, whereby a three-dimensional CT image of the scanned object can be reconstructed, the back projection formula, in an example embodiment, is as follows:

$$f^{C-FDK}(x, y, z) = \int_0^{2\pi} g^{C-FDK}(\theta, t(x, y, \theta), c(x, y, z, \theta)) d\theta \quad (11)$$

where the calculation formula of the projection location on the detector is as follows:

$$t(x, y, \theta) = y\cos\theta - x\sin\theta \quad (12)$$

$$c(x, y, z, \theta) = \frac{z \cdot (2\sqrt{R^2 - t^2} - R)}{\sqrt{R^2 - t^2} + x\cos\theta + y\sin\theta} \quad (13)$$

Figure 5A:
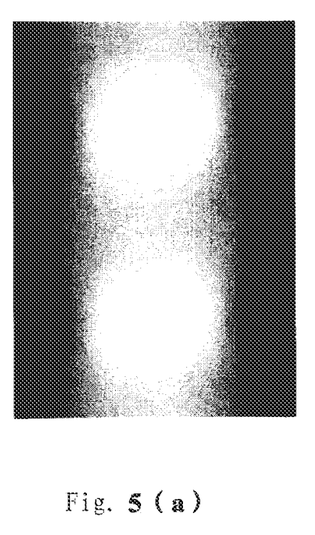
FIG. 5(a) illustrates projection data acquired by circular-orbit CT scanning, which is a sinusoidal chart composed of data of the central layer of a flat panel detector under individual angles, according to an example embodiment of the present invention.
Figure 5B:
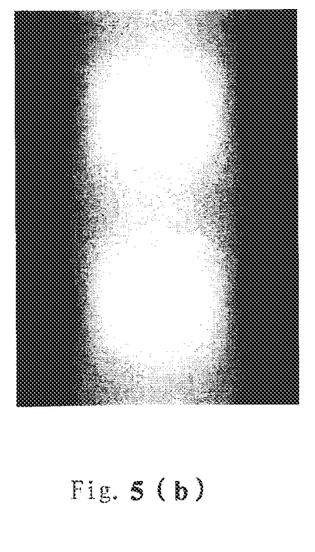
FIG. 5(b) is a sinusoidal chart composed of data of the central layer of a virtual detector under individual angles after project data is rebinned, according to an example embodiment of the C-FDK method of the present invention.
Figure 5C:
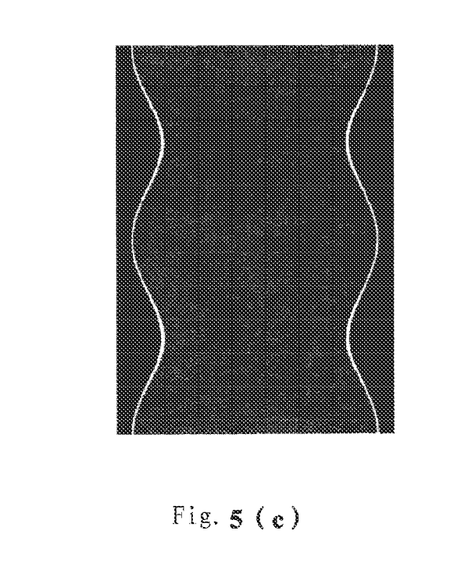
FIG. 5(c) is a schematic diagram of projection data obtained after implementing weighting processing on the projection data shown in FIG. 5(b), according to an example embodiment of the present invention.

FIG. 5(a) shows projection data acquired by circular-orbit CT scanning, which is a sinusoidal chart composed of data of the central layer of the flat panel detector under individual angles, while FIG. 5(b) is a sinusoidal chart composed of data of the central layer of a virtual detector under individual angles after projection data is rebinned by the C-FDK method according to an example embodiment of the present invention. FIG. 5(c) is projection data obtained after implementing weighting processing on the projection data shown in FIG. 5(b). Then, one-dimensional ramp filtering may be implemented on the projection data that has been implemented with weighting processing, and, lastly, back projection is implemented, whereby a CT image of the scanned object can be obtained, as shown in FIG. 6(d).

Figure 8:
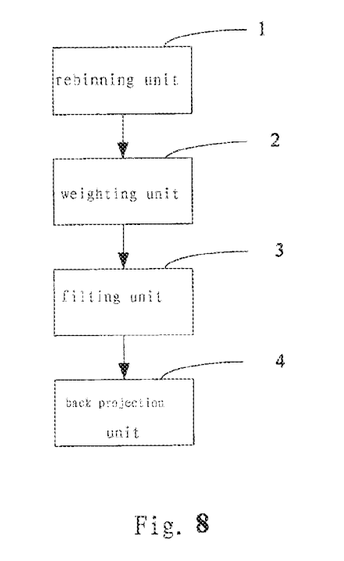
FIG. 8 is a schematic diagram of an apparatus for CT image reconstruction, according to an example embodiment of the present invention.

Correspondingly, as shown in FIG. 8, an apparatus for CT image reconstruction according to an example embodiment of the present invention includes: a rebinning unit 1 configured to select projection data of the same height on a curve having a curvature approximate to that of the scanning circular orbit; a weighting unit 2 configured to implement weighting processing on the selected projection data; a filtering unit 3 configured to filter the weighting processed projection data along the horizontal direction; and back projection unit 4 configured to implement three-dimensional back projection on the filtered projection data along the direction of ray.

Preferably, the rebinning unit 1 is configured to select projection data according to the following formula:

$$P^{C-FDK}(\theta, t, c) = P\left(\theta - \arcsin\frac{t}{R}, \frac{tR}{\sqrt{R^2 - t^2}}, \frac{c \cdot R^2}{2(R^2 - t^2) - R\sqrt{R^2 - t^2}}\right)$$

where $P^{C-FDK}$ (θ,t,c) indicates the selected projection data; θ indicates the projection direction, t indicates the distance between parallel fan beams, c indicates the angular sampling interval in the direction of Z axis, and R indicates the radius of the circular orbit.

Preferably, said weighting unit 2 is configured to process the selected projection data according to the following formula:

$$\tilde{P}^{C-FDK}(\theta, t, c) = \frac{2\sqrt{R^2 - t^2} - R}{\sqrt{5R^2 - 4t^2 - 4R\sqrt{R^2 - t^2} + c^2}} \cdot P^{C-FDK}(\theta, t, c)$$

where $\tilde{P}^{C-FDK}$ (θ,t,c) indicates the weighting processed projection data.

Preferably, said filtering unit 3 is configured to implement filtering according to the following formula:

$$g^{C-FDK}(\theta, t, c) = \tilde{P}^{C-FDK}(\theta, t, c) \otimes h(t) = \int_{-c_0}^{c_0} \tilde{P}^{C-FDK}(\theta, t, c) \cdot h(t - t') dt'$$

where $g^{C-FDK}$ (θ,t,c) indicates the filtered projection data, ⊗ indicates the convolution, and h(t) indicates the filtering function.

Preferably, said back projection unit 4 is configured to implement three-dimensional back projection according to the following formula:

$$f^{C-FDK}(x, y, z) = \int_0^{2\pi} g^{C-FDK}(\theta, t(x, y, \theta), c(x, y, z, \theta)) d\theta$$

where $f^{C-FDK}$ (x,y,z) indicates the reconstructed image in the direction of X axis, Y axis, and Z axis.

Because the technical features of the apparatus for CT image reconstruction of the present invention correspond to the technical features described with respect to the method for CT reconstruction of the present invention, therefore, the technical solution of the apparatus for CT image reconstruction of the present invention will not be described in detail.

The inventor of the present application has performed a numerical simulative experiment using the three-dimensional Shepp-Logan head model, and has made an experimental comparison with the FDK and T-FDK methods to verify the technical solutions of the present invention. In the numerical simulative experiment, the three-dimensional head model was limited within a 1 mm globe, the center of the model was the rotation center of CT scanning, the distance from the X-ray source to the rotation center was 4 mm, the distance from the X-ray source to the detector was 8 mm, the size of the flat panel detector was 4 mm×4 mm, the number of the detecting units was 256×256, 360 cone-beam projections were acquired uniformly in angle within the range of 360 degrees, and then a three-dimensional CT image was reconstructed. According to the geometric definition above, it can be calculated that in the experiment, the largest cone angle of the cone-beam X-ray is 14 degrees. That is, the X-ray cone angle range of this experiment is ±14°. With the circular-orbit cone-beam projection data under said above-described scanning condition, three-dimensional CT images were reconstructed respectively employing the FDK method, T-FDK method, and C-FDK method of the present invention.

Figures 6A, 6B:
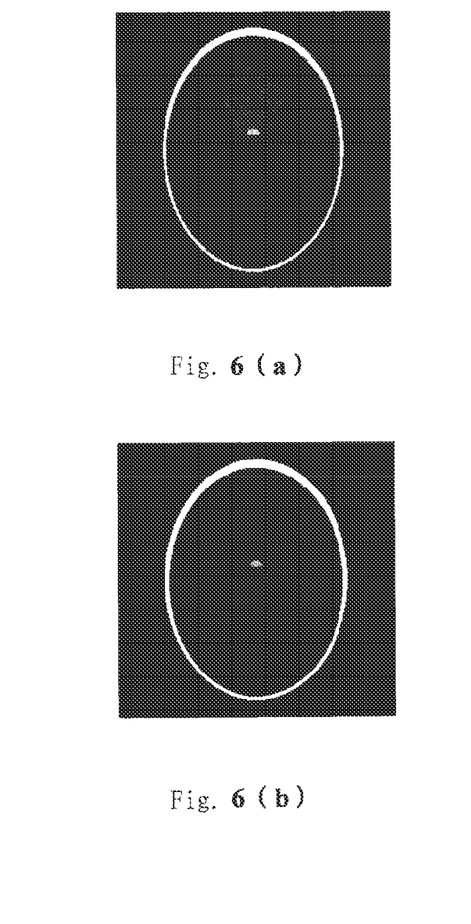
FIG. 6(a) is a schematic diagram of an accurate image of a three-dimensional Shepp-logan head model in a vertical section, according to an example embodiment of the present invention.
FIG. 6(b) is a schematic diagram of a reconstruction result obtained using the FDK method.
Figure 6C:
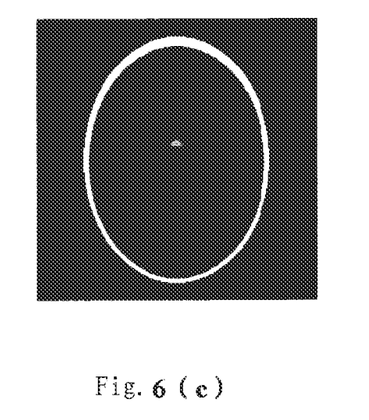
FIG. 6(c) is a schematic diagram of a reconstruction result obtained using the T-FDK method.
Figure 6D:
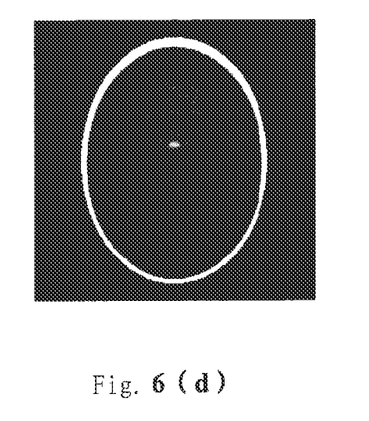
FIG. 6(d) is a schematic diagram of a reconstruction result obtained using the C-FDK method, according to an example embodiment of the present invention.

FIG. 6(a) is an accurate image of the Shepp-logan head model in a vertical section, where said vertical section is selected parallel to the x-z plane and where the three-dimensional head model is at the location y=−0.25. FIG. 6(b) is a reconstruction result obtained by employing the FDK method. FIG. 6(c) is a reconstruction result obtained by employing the T-FDK method. FIG. 6(d) is a reconstruction result obtained by employing the C-FDK method according to an example embodiment of the present invention.

It can be seen from each of the reconstructed images that the C-FDK method of the present invention can nicely reconstruct an image of the three-dimensional head model under the condition of ±14°, and it overcomes the difficult problem of cone beam artifact which is ubiquitous in large-cone-angle circular-orbit CT reconstruction in the existing methods, and nicely solves the problem of large-cone-angle circular-orbit CT image reconstruction.

Figure 7:
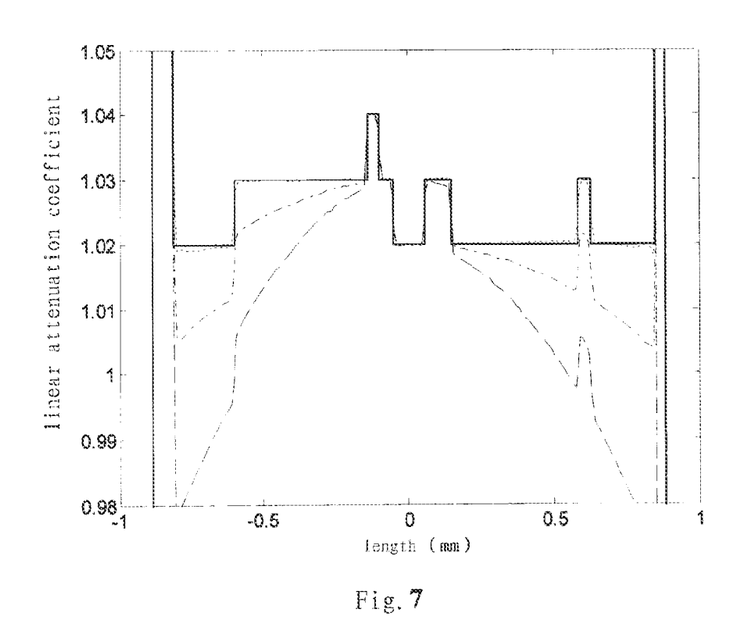
FIG. 7 is a schematic diagram of a reconstruction result after selecting a section line along the vertical center of sections of FIGS. 6(a), 6(b), 6(c), and 6(d).

In order to more accurately analyze the accuracy of the numerical value of the reconstruction result, FIG. 7 selects a section line taken along the vertical center of the section of FIG. 6, where the abscissa indicates the length coordinate of the points on the section line, the ordinate indicates the linear attenuation coefficient of the points on the section line, the long dashed line indicates the reconstruction result of the FDK method, the dash-dotted line indicates the reconstruction result of the T-FDK method, the short dashed line indicates the reconstruction result of the C-FDK method of the present invention, and the solid line indicates the accurate numerical value of the head model. It can be seen more clearly from the section line that when the cone angle increases, the reconstruction numerical values of the existing FDK and T-FDK methods show a rapidly decreasing trend, and go farther and farther from the accurate value of the model, while the C-FDK method of the present invention still can comparatively accurately reconstruct the accurate value of the original model even if it is within the cone angle range of ±14°, and fundamentally solves the difficult problem of large-cone-angle circular-orbit CT image reconstruction.

A core concept of the C-FDK method, according to example embodiments of the present invention, lies in the implementation of filtering on projection data for a virtual detector that is concave along the midline, and, in the derivation processes above, example embodiments of the present invention provide for rebinning X-ray and the projection of the same height on the OC curve in FIG. 2 into C-FDK data $P^{C-FDK}(\theta,t,c)$ of the same height c. While the OC curve has been described as a segment of an arc having the same curvature as the circular scanning orbit, variations of such OC curve may be used instead. For example, a variation within a small range may be made around the curvature in other example embodiments of the present invention.

Those skilled in the art can appreciate from the foregoing description that the present invention may be implemented in a variety of forms, that the various embodiments may be implemented alone or in combination, and that the above described example embodiments are not used for limiting the present invention. Therefore, while the embodiments of the present invention have been described in connection with particular examples thereof, the true scope of the embodiments of the present invention should not be so limited since other modifications will become apparent to the skilled practitioner upon a study of the drawings, specification, and following claims. Many duplicate and alternative solutions, including modifications, additions, permutations, and variations, will be apparent to those skilled in the art in light of the disclosed content of the present application and should fall within the protection scope of the present invention. Those skilled in the art may implement various variations, modifications, and equivalent substitutions to the described features of the invention without departing from the true spirit and scope of the invention. Such variations, modifications, and equivalent substitutions are intended to fall within the spirit and scope defined by the following claims.

The invention claimed is:

1. A method for CT image reconstruction, comprising:
   selecting projection data of a same height on a curve whose curvature is approximate to that of a scanning circular orbit;
   implementing, by a computer processor, weighting processing on the selected projection data;
   filtering, by the processor, the weighting processed projection data along a horizontal direction; and
   implementing, by the processor, three-dimensional back projection on the filtered projection data along a direction of a ray;

wherein:
   the selecting of the projection data includes selecting projection data according to the formula $$P^{C-FDK}(\theta, t, c) = P\left(\theta - \arcsin\frac{t}{R}, \frac{tR}{\sqrt{R^2 - t^2}}, \frac{c \cdot R^2}{2(R^2 - t^2) - R\sqrt{R^2 - t^2}}\right);$$

$P^{C-FDK}(\theta,t,c)$ indicates the selected projection data;
   θ indicates a projection direction;
   t indicates a distance between parallel fan beams;
   c indicates an angular sampling interval in a Z axis direction; and
   R indicates a radius of the circular orbit.

2. The method for CT image reconstruction according to claim 1, wherein:
   the implementing of the weighting processing includes processing the selected projection data according to the formula $$\tilde{P}^{C-FDK}(\theta, t, c) = \frac{2\sqrt{R^2 - t^2} - R}{\sqrt{5R^2 - 4t^2 - 4R\sqrt{R^2 - t^2} + c^2}} \cdot P^{C-FDK}(\theta, t, c);$$

and
   $\tilde{P}^{C-FDK}(\theta,t,c)$ indicates the weighting processed projection data.

3. The method for CT image reconstruction according to claim 2, wherein the filtering includes filtering according to the formula $$g^{C-FDK}(\theta, t, c) = \tilde{P}^{C-FDK}(\theta, t, c) \otimes h(t) = \int_{-c_0}^{c_0} \tilde{P}^{C-FDK}(\theta, t, c) \cdot h(t - t') \, dt';$$

$g^{C-FDK}(\theta,t,c)$ indicates the filtered projection data;
   ⊗ indicates a convolution; and
   h(t) indicates a filtering function.

4. The method for CT image reconstruction according to claim 3, wherein the implementing of the three-dimensional back projection includes implementing three-dimensional back projection according to the formula $$f^{C-FDK}(x, y, z) = \int_0^{2\pi} g^{C-FDK}(\theta, t(x, y, \theta), c(x, y, z, \theta)) d\theta;$$

and
   $f^{C-FDK}(x,y,z)$ indicates the reconstructed image in a direction of X axis, Y axis, and Z axis.

5. An apparatus for CT image reconstruction, comprising:
   a rebinning unit configured to select projection data of a same height on a curve whose curvature is approximate to that of a scanning circular orbit;
   a weighting unit configured to implement weighting processing on the selected projection data;
   a filtering unit configured to filter the weighting processed projection data; and
   a back projection unit configured to implement three-dimensional back projection on the filtered projection data along a direction of a ray;

wherein:
the rebinning unit is configured to select projection data according to the formula $$P^{C-FDK}(\theta, t, c) = P\left(\theta - \arcsin\frac{t}{R}, \frac{tR}{\sqrt{R^2-t^2}}, \frac{c \cdot R^2}{2(R^2-t^2) - R\sqrt{R^2-t^2}}\right);$$

$P^{C-FDK}(\theta,t,c)$ indicates the selected projection data;
$\theta$ indicates a projection direction;
t indicates a distance between parallel fan beams;
c indicates an angular sampling interval in a Z axis direction; and
R indicates a radius of the circular orbit.

6. The apparatus for CT image reconstruction according to claim 5, wherein the weighting unit is configured to process the selected projection data according to the formula $$\tilde{P}^{C-FDK}(\theta, t, c) = \frac{2\sqrt{R^2-t^2} - R}{\sqrt{5R^2 - 4t^2 - 4R\sqrt{R^2-t^2} + c^2}} \cdot P^{C-FDK}(\theta, t, c);$$

and
$\tilde{P}^{C-FDK}(\theta,t,c)$ indicates the weighting processed projection data.

7. The apparatus for CT image reconstruction according to claim 6, wherein the filtering unit is configured to implement one-dimensional ramp filtering according to the formula $$g^{C-FDK}(\theta, t, c) = \tilde{P}^{C-FDK}(\theta, t, c) \otimes h(t) = \int_{-c_0}^{c_0} \tilde{P}^{C-FDK}(\theta, t, c) \cdot h(t-t')\,dt';$$

$g^{C-FDK}(\theta,t,c)$ indicates the filtered projection data;
$\otimes$ indicates a convolution; and
h(t) indicates a filtering function.

8. The apparatus for CT image reconstruction according to claim 7, wherein the back projection unit is configured to implement three-dimensional back projection according to the formula $$f^{C-FDK}(x, y, z) = \int_0^{2\pi} g^{C-FDK}(\theta, t(x, y, \theta), c(x, y, z, \theta))\,d\theta;$$

and
$f^{C-FDK}(x,y,z)$ indicates the reconstructed image in a direction of X axis, Y axis, and Z axis.

* * * * *

UNITED STATES PATENT AND TRADEMARK OFFICE
CERTIFICATE OF CORRECTION

PATENT NO. : 8,724,889 B2  
APPLICATION NO. : 13/140761  
DATED : May 13, 2014  
INVENTOR(S) : Liang Li et al.

Page 1 of 1

It is certified that error appears in the above-identified patent and that said Letters Patent is hereby corrected as shown below:

In the Specification

Column 1, line 4, add "CROSS-REFERENCE TO RELATED APPLICATION

This application is a national stage application of International Patent Application No. PCT/CN11/00830 filed May 11, 2011, which claims priority under 35 U.S.C. § 119 to Chinese Patent Application No. 201010529974.0, filed October 28, 2010.";

Column 4, line 57, change "f $^{C\text{-}FDK}$ (x,y,z)" to -- $f^{C\text{-}FDK}$ (x,y,z) --;

Column 5, line 48, change "f $^{C\text{-}FDK}$ (x,y,z)" to -- $f^{C\text{-}FDK}$ (x,y,z) --;

Column 10, line 20, change "f $^{C\text{-}FDK}$ (x,y,z)" to -- $f^{C\text{-}FDK}$ (x,y,z) --;

In the Claims

Column 12, line 10, change "P $^{C\text{-}FDK}$ (θ t, c)" to -- $P^{C\text{-}FDK}$ (θ, t, c) --; and Column 14, line 24, change "f $^{C\text{-}FDK}$ (x,y,z)" to -- $f^{C\text{-}FDK}$ (x,y,z) --.

Signed and Sealed this  
Eleventh Day of November, 2014

Michelle K. Lee  
*Deputy Director of the United States Patent and Trademark Office*